Nov. 21, 1961

J. C. DE BROEKERT ET AL 3,010,072

CRYSTAL DETECTOR ASSEMBLY

Filed Nov. 20, 1958

INVENTORS.
JAMES C. de BROEKERT
WILLIAM E. AYER
BY Harold T. Stowell
Harold L. Stowell
ATTORNEYS.

United States Patent Office 3,010,072
Patented Nov. 21, 1961

3,010,072
CRYSTAL DETECTOR ASSEMBLY
James C. de Broekert, Palo Alto, and William E. Ayer, Menlo Park, Calif., assignors to Research Corporation, New York, N.Y., a corporation of New York
Filed Nov. 20, 1958, Ser. No. 775,183
5 Claims. (Cl. 329—162)

The present invention relates to a microwave crystal detector assembly and, more particularly, to an improved low capacitance crystal detector assembly having wide video bandwidth characteristics.

There frequently arises the necessity to provide a wide video or post-detection bandwidth detector for a coaxial line when dealing with the transmission of high-frequency microwave energy. The necessity arises typically in electronic systems such as those used in high-definition radar (airport surveillance, mapping, etc.), high-definition television, high-information rate data transmission systems, and electronic counter-measure systems. However, unless the termination is such as to present to the coaxial line an impedance substantially equal to the characteristic impedance of the coaxial line, the received energy signals will be distorted by effects arising from impedance mismatch, reflection, and standing waves along the coaxial line. When detected signal envelope currents are caused to circulate through a network consisting of the detector output capacitance, wiring capacitances and following amplifier input capacitance, the effects are such that a restricted video bandwidth results.

With these problems in mind, attempts have been made to overcome them with reasonable success within limited frequency ranges. Among the typical techniques employed to overcome the aforementioned problems and to thereby increase the video bandwidth characteristics of the detector is resistance loading at the detector output. However, this scheme results in a severe sacrifice of detection efficiency. Another method utilizes a capacitance neutralizing technique wherein a relatively wide video bandwidth is achieved but since this technique requires the use of a secondary emission tube, the inherent noise tends to mask the signal when operating at low signal levels.

It is, therefore, the object of the present invention to produce a capacitance guarded crystal detector assembly capable of detecting a broad video or post detection bandwidth without sacrificing pre-detection or R-F bandwidth, impedance matching or detection efficiency.

This and other objects and advantages of the invention will be apparent from the following specification when considered with the accompanying drawings in which.

Figure 1:
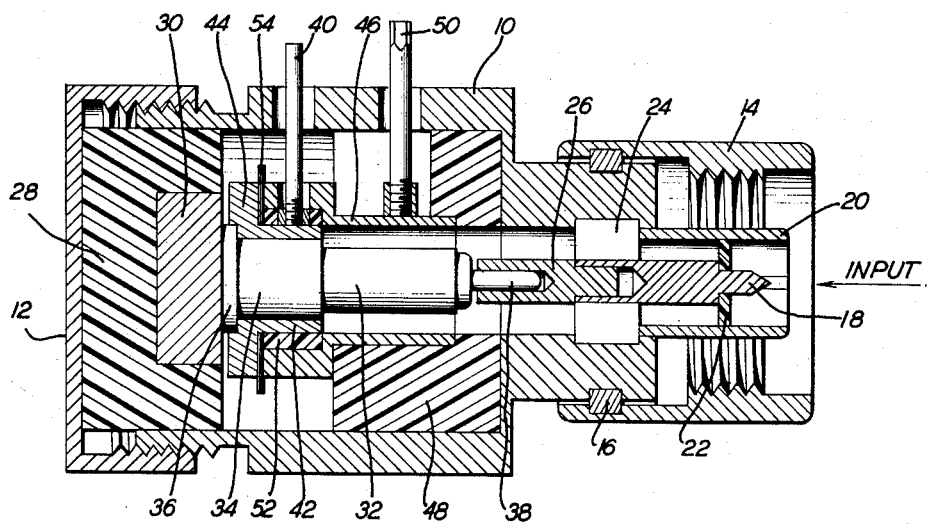
FIGURE 1 is an axial section of the crystal detector assembly of the invention.

There is shown in FIGURE 1 the crystal detector assembly of the present invention wherein reference numeral 10 identifies a cylidrical metal shell of the crystal detector assembly which is provided with a threaded portion at one end to receive a metal end closure cap 12. A coaxial connector 14 is suitably connected to the opposite end of the metal shell 10 by an annular sealing ring 16 which snugly fits within suitable channels formed in the outer surface of the metal shell 10 and the inner surface of the connector 14. The connector 14 is further provided with interior threads for receiving and securing a coaxial input cable (not shown) to the crystal detector assembly.

The input through the crystal detector assembly is through a coaxial cable arrangement associated with the connector 14, the inner connector of which is connected to a projecting metal stud 18 and the outer conductor is connected to the cylindrical sleeve 20. The end of the stud 18 which is in contact with the inner connector of the associated input coaxial cable is supported within and insulated from the outer sleeve 20 by an insulating member 22 of polystyrene or equivalent insulating material. The opposite end of the stud 18 is supported within a bushing 24 which, in turn, is supported within the inner surface of the reduced diameter net portion of the metal shell 10. The end of the conductor 18, which is disposed within the bushing 24, is provided with a central bore adapted to receive a reduced nose portion of another conductor member 26 which is also provided with a central bore at the opposite end.

Disposed within the cylindrical shell 10 and adjacent the end cap 12, there is a filler plug 28 of polystyrene or other suitable insulating material. The filler plug 28 is so formed as to receive a damper element 30 formed of a suitable dampening material such as for example, Synthane. Synthane is a material which is commercially available and is a uniformly dense, laminated, thermosetting plastic, made with various types of filler materials, such as cotton fabrics, paper, asbestos paper, asbestos cloth, woven Fiberglas cloth, nylon fabric, etc., all impregnated with phenolic or malamine resins and then laminated under heat and pressure. Synthane has been found to provide satisfactory results in the crystal detector assembly of the present invention in that it is light in weight, dense, structurally strong, and resistant to moisture.

A crystal detector unit of known type such as 1N23BR comprising a tube 32 of insulating material housing the crystal and closed at one end by a metal sleeve 34 which terminates in a radially extending flange portion 36 is disposed coaxially within the cylindrical metal shell 10 such that the flange 36 of the metal sleeve 34 is in intimate contact with the dampening member 30. The forward end of the crystal detector unit is provided with a tip terminal 38 received by and supported within the longitudinal central bore of the conductor member 26.

The sleeve terminal 34 of the crystal detector unit is connected to a video output pin 40 by a conducting sleeve 42 which may be formed of a metal such as, for example, brass. The sleeve 42 is provided with a radially extending flange portion 44.

A guard electrode 46 is adapted to surround the tube 32 of the crystal detector unit and is supported within and insulatingly spaced from the cylindrical metal shell 10 by an insulating bushing 48 of polystyrene or equivalent insulating material. The electrode 46 is provided with a guard pin 50 which extends radially outwardly therefrom through a suitable aperture formed in the wall of the metal cylinder 10. The inner surface of the electrode 46 is insulatingly spaced from the sleeve terminal 34 of the crystal detector unit by an insulating bushing 52 of polystyrene or equivalent insulating material. Between the lateral end face of the electrode 46 and the adjacent lateral face of the radially extending flange portion 44 of the conducting sleeve 42 there is provided an annular bypass member 54 preferably formed of a material such as mica.

It will be readily appreciated from the foregoing description that the elements of the crystal detector assembly described may be snugly and positively engaged within the outer cylindrical metal shell 10 by screwing down the end closure cap 12 a suitable amount.

In the assembly shown in FIGURE 1, the crystal detector unit, comprised of the tip 38, the tube 32, and the metal sleeve 34, is used as a simple detector, with radio frequency energy from a single source applied to the crystal tip 38 and the video output energy taken from the sleeve 34 through the video output pin 40.

Figure 2:
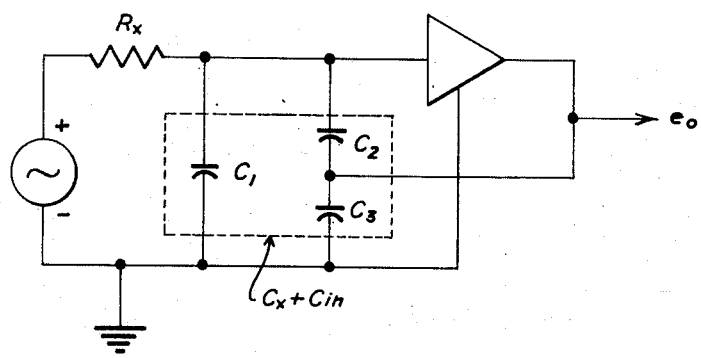
FIGURE 2 is an equivalent circuit of the invention.

The capacitance-guarded detector illustrated in FIGURE 1 is based on the splitting of the total shunt video capacitance ($C_x + C_{in}$) into three capacitors in a delta configuration. FIGURE 2 shows an equivalent circuit for the detector illustrated in FIGURE 1 wherein $R_x$ represents the video resistance which is determined by the type of crystal employed, the R-F signal level, and the amount of D.C. forward bias used. $C_x$ represents the output capacitance of the crystal detector due to the R-F bypass and output capacitance of the crystal mount; and $C_{in}$ represents the effective input capacitance of an associated video amplifier.

It will be appreciated that the desired splitting of the input capacitance into the delta configuration while maintaining adequate R-F bypassing at the video terminals is achieved through the employment of the guard electrode 46 and its associated mica spacer element 54. The spacer element 54 serves as an R-F bypass from the crystal base 34 to the guard electrode 46. The gap between the guard electrode 46 and the input R-F connector shell 20 (which is at ground potential) is located ¼ wavelength from the base of the crystal and, therefore, is at an open circuit point in the line. This gap serves as an R-F short from the guard electrode to ground.

An alternate construction or modification of the structure shown would be to close the gap mentioned above and to use a mica bypass element from the guard electrode 46 to ground. Such a modification would eliminate the coupling out of any R-F energy which might otherwise occur within the gap of the device shown in FIGURE 1.

Figure 3:
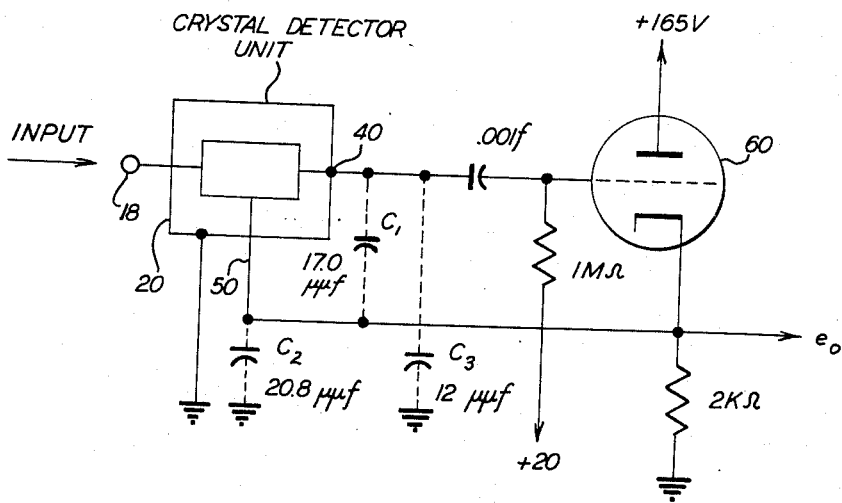
FIGURE 3 is a schematic illustration of a typical circuit employing the crystal detector assembly of the invention.

A typical circuit employing the detector unit of the present invention is illustrated in FIGURE 3 wherein a cathode follower 60, such as a Western Electric 417A, is used to drive the guard electrode 46 and the following video amplifier. Thus the guard electrode 46 is maintained at the same video potential as the output members of the detector unit which includes the sleeve 34, the output pin 40, the conducting sleeve 42, and the flange 44, thereby effectively cancelling out the effect of the capacitance C2 between the detector and guard electrode 46. This reduces the total effective detector output shunt capacitance to $C_1$ which is very much smaller than the original total detector ouput or video shunt capacitance shown as $C_x + C_{in}$. Because of this greatly reduced effective shunt output capacitance, the video output bandwidth of the detector is substantially increased. The dotted capacitors $C_1$, $C_2$, $C_3$ represent the total measured effective capacitances of the equivalent circuit of FIGURE 2.

It has been found that in circuitry constructed in accordance with the principles of the invention that the 3 decibel video or post-detection bandwidth was 18.7 megacycles. Rise-time measurements have indicated a 10-90% rise-time of 0.02 μsec.

According to the provisions of the patent statutes, we have explained the principles and mode of operation of our invention, and have illustrated and described what we now consider to represent its best embodiment. However, we desire to have it understood that, within the scope of the appended claims, the invention may be practiced otherwise than as specifically illustrated and described.

We claim:

1. A crystal detector assembly comprising a grounded metal shell, a removable metal cap for one end of said shell, a crystal detector unit insulatedly mounted within said metal shell, said crystal detector unit having a tip terminal at one end and a sleeve terminal at the other end, coaxial input conductor means including an inner conductor connected to the tip terminal of said crystal detector unit and an outer conductor connected to said metal shell, an output conductor connected to the sleeve terminal of said crystal detector unit, a guard electrode disposed coaxially about at least a portion of the bypass means disposed at both ends of said guard electrode to permit the bypass of R-F energy from the sleeve terminal to said guard electrode and thence to said grounded shell.

2. An assembly as defined in claim 1 wherein said bypass member is comprised of mica.

3. An assembly as defined in claim 1 including a resonance dampening means disposed within said metal cap and having a surface thereof adjacent the sleeve terminal of said crystal detector unit.

4. A crystal detector assembly comprising a grounded metal shell, a crystal detector unit insulatedly mounted within said shell, said unit having a tip terminal at one end and a sleeve terminal at the other end, coaxial input means connected to the tip terminal, output means connected to the sleeve terminal, and guard electrode means in adjacent insulatedly spaced proximity to said sleeve terminal and said output means, and means for maintaining said guard electrode at substantially the same potential as said output means, whereby the effective capacitance between said detector unit and said shell is substantially reduced.

5. In a crystal detector assembly having a conductive shell and a crystal detector unit having an output conductor within said shell, a guard electrode in proximity to said detector unit and means for maintaining said guard electrode at substantially the same potential as said output conductor, whereby the effective capacitance between said detector unit and said shell is substantially reduced.

References Cited in the file of this patent

UNITED STATES PATENTS

| | | |
|---|---|---|
| 2,433,387 | Mumford | Dec. 30, 1947 |
| 2,498,335 | Hunt | Feb. 21, 1950 |
| 2,557,122 | Leiphart | June 19, 1951 |
| 2,636,120 | Bird et al. | Apr. 21, 1953 |
| 2,734,170 | Engelmann et al. | Feb. 7, 1956 |
| 2,810,829 | Schrock | Oct. 22, 1957 |
| 2,872,569 | Bradall | Feb. 3, 1959 |
| 2,956,160 | Sharpless | Oct. 11, 1960 |